United States Patent
Ramegowda et al.

(10) Patent No.: US 11,210,158 B2
(45) Date of Patent: Dec. 28, 2021

(54) AUTOMATED PROBLEM DIAGNOSIS ON LOGS USING ANOMALOUS TELEMETRY ANALYSIS

(71) Applicant: Riverbed Technology, Inc., San Francisco, CA (US)

(72) Inventors: Sindhura Ramegowda, San Jose, CA (US); Rostyslav Buchko, Berkeley, CA (US); Yifeng Liu, Castro Valley, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 178 days.

(21) Appl. No.: 16/201,769

(22) Filed: Nov. 27, 2018

(65) Prior Publication Data
US 2019/0163553 A1  May 30, 2019

Related U.S. Application Data

(60) Provisional application No. 62/592,291, filed on Nov. 29, 2017.

(51) Int. Cl.
*G06F 11/07* (2006.01)
*G06F 16/903* (2019.01)

(52) U.S. Cl.
CPC ........ *G06F 11/079* (2013.01); *G06F 11/0709* (2013.01); *G06F 11/0784* (2013.01); *G06F 11/0793* (2013.01); *G06F 16/90335* (2019.01)

(58) Field of Classification Search
CPC .............. G06F 11/079; G06F 11/0709; G06F 11/0784; G06F 11/0793
See application file for complete search history.

(56) References Cited

U.S. PATENT DOCUMENTS

| | | | |
|---|---|---|---|
| 8,112,667 B2 | 2/2012 | Belluomini et al. | |
| 8,495,429 B2 | 7/2013 | Fu et al. | |
| 9,396,061 B1* | 7/2016 | Nair | G06F 11/3452 |
| 9,633,106 B1 | 4/2017 | Saurabh et al. | |
| 2013/0227589 A1* | 8/2013 | Mikami | G06F 11/327 |
| | | | 719/318 |
| 2014/0074850 A1* | 3/2014 | Noel | G06F 11/0709 |
| | | | 707/741 |
| 2015/0032669 A1 | 1/2015 | Winnick | |
| 2015/0066814 A1* | 3/2015 | Allen | G06F 40/30 |
| | | | 706/11 |

(Continued)

*Primary Examiner* — Yolanda L Wilson

(74) *Attorney, Agent, or Firm* — Park, Vaughan, Fleming & Dowler LLP; Laxman Sahasrabuddhe

(57) ABSTRACT

Systems and techniques are described for performing automatic problem diagnosis. Telemetry data of a system can be analyzed to identify a set of time ranges during which the telemetry data exhibits anomalous behavior. Next, a subset of log entries having a timestamp that is in one of the time ranges in set of time ranges can be extracted from a set of log entries generated by the system. The subset of log entries can then be analyzed, by using natural language processing, to identify a subset of the subset of log entries that has a high likelihood to be associated with one or problems in the system. Next, human-readable text can be extracted from the subset of the subset of log entries. A knowledge database can then be searched by using the human-readable text to identify one or more solutions to resolve the one or more problems in the system.

18 Claims, 3 Drawing Sheets

(56) References Cited

U.S. PATENT DOCUMENTS

| | | |
|---|---|---|
| 2015/0286627 A1 | 10/2015 | Chang et al. |
| 2015/0339265 A1 | 11/2015 | Thibaux |
| 2016/0004582 A1* | 1/2016 | Nagura ................... G06F 11/34 714/15 |
| 2017/0068721 A1* | 3/2017 | Chafle ................... G06F 11/079 |
| 2017/0075749 A1* | 3/2017 | Ambichl ............. G06F 11/0748 |
| 2017/0083390 A1* | 3/2017 | Talwadker .......... G06F 11/0748 |
| 2020/0226014 A1* | 7/2020 | Kirshenbaum ....... G06F 11/079 |

\* cited by examiner

AUTOMATED PROBLEM DIAGNOSIS ON LOGS USING ANOMALOUS TELEMETRY ANALYSIS

RELATED APPLICATION

This application claims benefit of U.S. Provisional Patent Application No. 62/592,291, entitled "AUTOMATED PROBLEM DIAGNOSIS ON LOGS USING ANOMALOUS TELEMETRY ANALYSIS," by the same inventors, filed on 29 Nov. 2017, the contents of which are herein incorporated by reference in their entirety for all purposes.

BACKGROUND

The present disclosure generally relates to automated problem diagnosis. More specifically, the present disclosure relates to automated problem diagnosis on logs using anomalous telemetry analysis. When an enterprise encounters a problem with its computing and/or networking system, the enterprise typically contacts the equipment vendor, who then provides a support technician to investigate the problem. Such manual problem diagnosis approaches are labor intensive, error prone, costly, and cumbersome.

A number of approaches have been proposed for automatic problem diagnosis. For example, the following documents describe approaches that can be used for automatic problem diagnosis: U.S. Publication No. 2015/0032669 entitled "Systems and methods for automated troubleshooting," and U.S. Pat. No. 8,112,667 entitled "Automated system problem diagnosing."

Unfortunately, the existing approaches for automatic problem diagnosis suffer from multiple drawbacks. The fast changing nature of the software technology stack means that a saved state of any problem diagnosis system for logs is soon outdated. Some of the existing approaches rely on looking at system logs as a standalone entity, which often leads to a large number of log message groups, thereby overwhelming and confusing the user. Yet other approaches rely on extensive user input which is not possible when the users in question are external and have insufficient knowledge of the system under investigation. Some of the above-mentioned approaches also require a specialized database of decision trees, which can be very costly and take a long time to develop and maintain. Also, some of the existing approaches look at the device logs in isolation, which may not provide sufficient context into the troubleshooting process. Finally, some of the existing approaches result in identifying too many possible problems, thereby overwhelming the user.

Therefore, what are required are automated approaches for problem diagnosis without the above-described drawbacks.

SUMMARY

The present disclosure presents methods and apparatuses for performing automatic problem diagnosis for a system that can comprise multiple devices. Each device can generate telemetry data, and the processes executing on each device can generate a large number of log entries that are stored in one or more log files. The telemetry data can include periodic measurements of processor utilization, memory usage, disk load, network traffic metrics, etc. The set of log entries can include notifications, warnings, error, and/or alarms messages generated by processes executing on the devices. Specifically, some embodiments described herein use the telemetry data in conjunction with the log entries to automatically diagnose problems in the system.

Specifically, some embodiments can analyze telemetry data of a system to identify a set of time ranges during which the telemetry data exhibits anomalous behavior. Next, the embodiments can extract, from a set of log entries generated by the system, a subset of log entries having a timestamp that is in one of the time ranges in set of time ranges. The embodiments can then analyze, by using natural language processing, the subset of log entries to identify a subset of the subset of log entries that has a high likelihood to be associated with one or problems in the system. Next, the embodiments can extract human-readable text from the subset of the subset of log entries. The embodiments can then search a knowledge database by using the human-readable text to identify one or more solutions to resolve the one or more problems in the system.

In some embodiments, analyzing telemetry data of the system comprises using self-similarity analysis of a time series of a system variable. In some embodiments, analyzing telemetry data of the system comprises detecting when a system variable value is outside a normal operating range. In some embodiments, analyzing telemetry data of the system comprises detecting anomalous behavior based on calculating a discrepancy between (1) a piecewise linear model of mutual dependence between two system variables that is created based on historical data, and (2) measured values of the two system variables in the telemetry data.

In some embodiments, the embodiments can include a support portal that can enable customers to use automatic problem diagnosis. Specifically, (1) prior to analyzing the telemetry data of the system, the embodiments can receive the telemetry data and the set of log entries from a user via the support portal, and (2) after searching the knowledge database, the embodiments can display the one or more solutions to the user via the support portal.

In some embodiments, identifying the subset of the subset of log entries by using natural language processing comprises: (1) calculating a sentiment score for each log entry in the set of log entries, and (2) identifying the subset of the subset of log entries by ordering log entries based on increasing sentiment scores, whereby the log entries that are most likely to be associated with the one or more problems in the system appear at the top of the ordering.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc.

According to one definition, a data communication network (or "network" for short) is an interconnection of one or more devices that is capable of delivering information from one computer to another computer. Examples of networks include, but are not limited to, wireless and wired networks, local area networks (LANs), metropolitan area networks (MANs), wide area networks (WANs), private networks, public networks, intranets, internets, etc. Data communication networks often include a variety of network devices for sending, receiving, directing, and optimizing network data traffic.

Figure 1A:
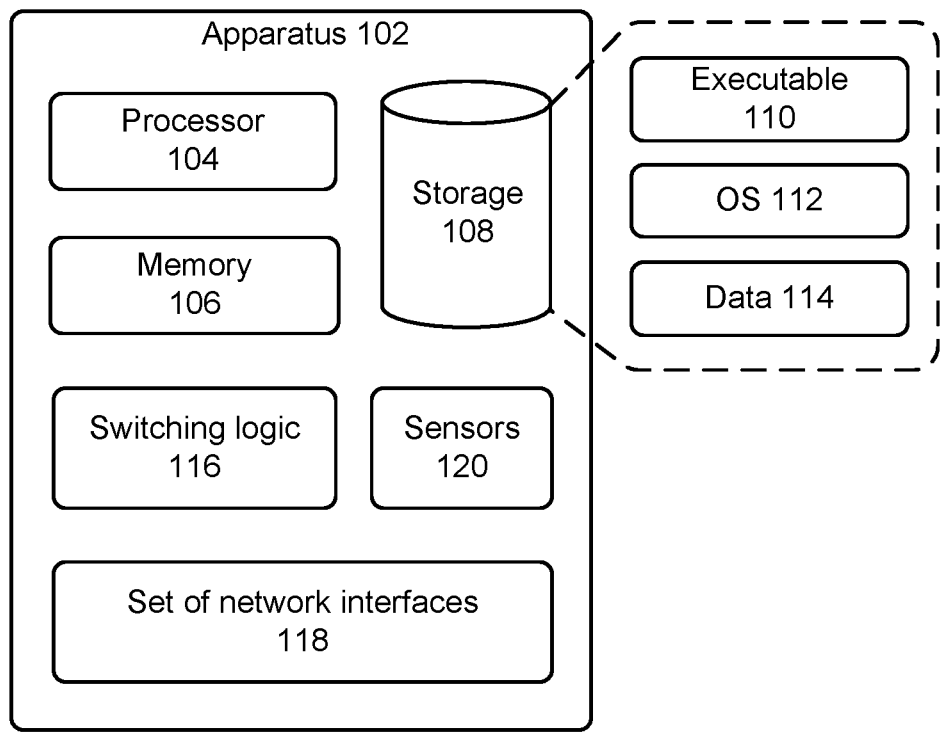
FIG. 1A illustrates an apparatus or device in accordance with some embodiments described herein.

FIG. 1A illustrates an apparatus or device in accordance with some embodiments described herein. Apparatus 102 (e.g., a computer, a web server, an application server, router, WAN accelerator, etc.) comprises processor 104, memory 106 (e.g., a volatile or non-volatile random access memory), and storage 108 (e.g., a flash memory device or a disk drive). Storage 108 can store executable 110, operating system 112, and data 114. The components in apparatus 102 can communicate with one another using a communication mechanism, e.g., a bus, a backplane, and/or a switching fabric. Executable 110 can include instructions that, when executed by processor 104, cause apparatus 102 to perform one or more methods that are implicitly or explicitly described in this disclosure. Data 114 can include any data that is inputted into or outputted by executable 110.

Apparatus 102 can also include switching logic 116 and set of network interfaces 118. Set of network interfaces 118 can be used to transmit data to and/or receive data from other communication devices. Switching logic 116 can forward network traffic received on one or more network interfaces in accordance with switching/forwarding/routing information stored in apparatus 102. Specifically, switching logic 116 can be configured by processor 104 in accordance with one or more methods that are implicitly or explicitly described in this disclosure. Apparatus 102 can also include sensors 120 that can measure one or more physical parameters, such as temperature. Telemetry data can include processor utilization, memory usage, disk load (e.g., the amount of read and write operations that are being performed on storage 108), network traffic metrics (e.g., bandwidth utilization), and measurements from sensors 120.

Figure 1B:
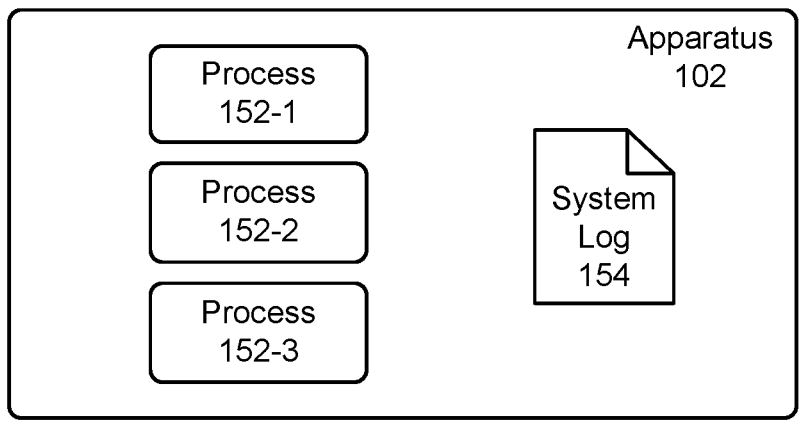
FIG. 1B illustrates a logical view of an apparatus or device in accordance with some embodiments described herein.

FIG. 1B illustrates a logical view of an apparatus or device in accordance with some embodiments described herein. Apparatus 102 can include multiple executing processes, e.g., 152-1, 152-2, and 152-3, and a system log 154. During execution, processes 152-1, 152-2, and 152-3 can generate notifications, warnings, errors, and/or alarms that are stored in system log 154.

A system will typically include multiple apparatuses or devices (e.g., an enterprise network comprising multiple servers, routers, switches, WAN optimizers, etc.). Each apparatus in a system will typically generate its own telemetry data and will have its own system log. Some embodiments described herein take into account the entire system's condition when identifying possible troubleshooting issues in the system logs. Specifically, some embodiments identify time ranges when the system telemetry (e.g., processor utilization, memory usage, disk load, network traffic metrics, etc.) exhibits anomalous behavior. The anomalies in system metrics can be determined by a combination of self-similarity analysis of time series describing a single system variable, and where the variable response to network traffic differs from a historical model. In some embodiments, a piecewise linear model of mutual dependence can be constructed for any two system statistics, and the discrepancy between the model and the truth (i.e., the actual measured values of system parameters) can be used to deduce the time frame of likely anomalies. These anomaly time frames are then used to narrow down the search across the system logs, which have outputs from different processes, and which can be quite large in size. The result of this filtering process is a substantially smaller subsets of logs.

Next, sentiment analysis of the selected log subsets can be performed using natural language processing to obtain texts that are possible problem identifiers. These log texts can then be stripped of timestamps, error codes, machine identifiers, etc., for easy human parsing and to be compatible for natural language search across external knowledge management systems. By using this approach, it is possible to localize the most likely human-readable log text to be analyzed and substantially save on computing power and time.

Embodiments described herein significantly reduce the number of log texts used to indicate problem identifiers in a complex system by correlating the rest of the system condition in an intelligent automated log analysis with least amount of human interaction. These embodiments are not dependent on log message versioning and system software versioning, which is a significant advantage over certain existing automated log analysis systems. Specifically, the embodiments described herein are not affected if the log pattern changes with new hardware and/or software versions. By reducing the time ranges of log texts to be looked at in the first pass, more computing power can be used for intelligently prioritizing log searches if the users wish to look beyond these time frames.

As explained above, existing approaches do not take into consideration a time series analysis to obtain anomalous time sequences in order to filter log text patterns, which can then be further clarified using sentiment analysis to provide automated system troubleshooting. Enterprise networks, and even individual network devices are complex systems which already have a high volume of data to sift through when troubleshooting. In existing approaches, the industry employs a high number of service professionals with necessary knowledge to aid this process. In contrast to existing approaches, embodiments described herein enable fast and accurate automated troubleshooting to be implemented in large and complex systems.

Figure 2:
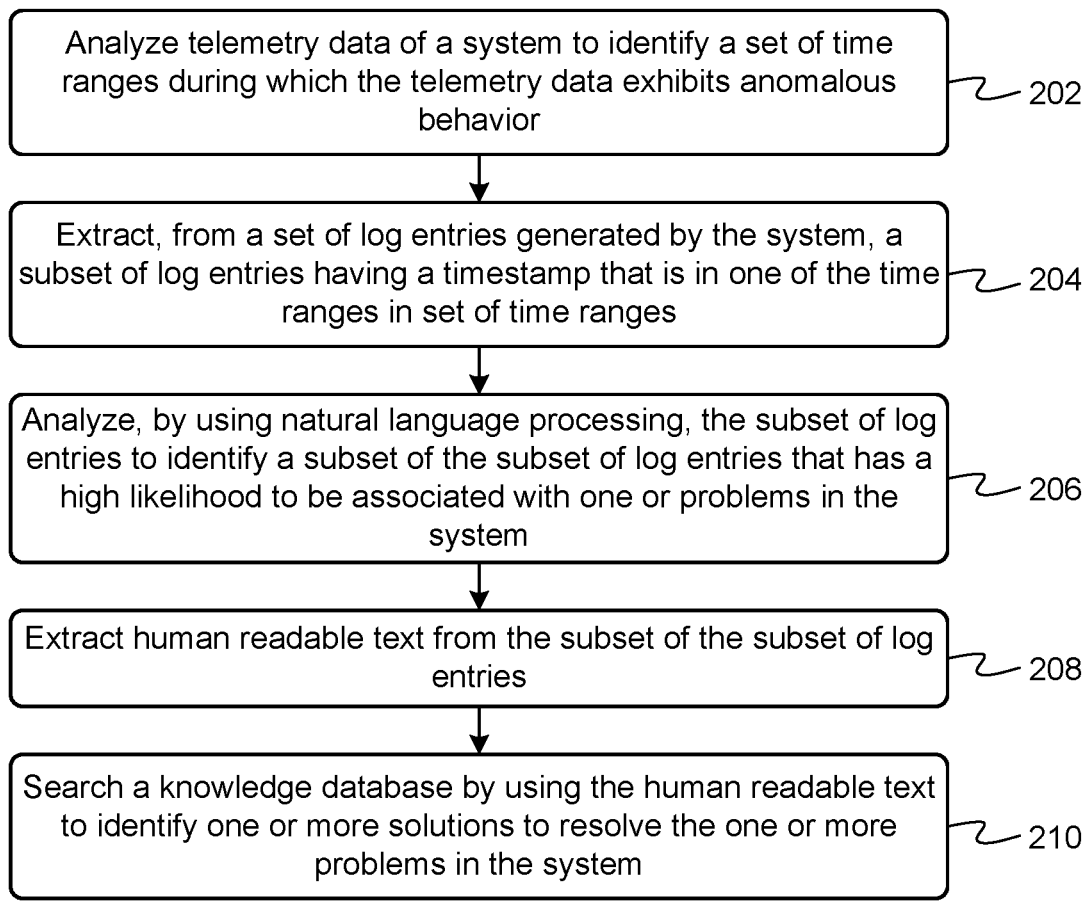
FIG. 2 illustrates a process for automated problem diagnosis in accordance with some embodiments described herein.

FIG. 2 illustrates a process for automated problem diagnosis in accordance with some embodiments described herein. The process can begin by analyzing telemetry data of a system to identify a set of time ranges during which the telemetry data exhibits anomalous behavior (step 202). Next, the process can extract, from a set of log entries generated by the system, a subset of log entries having a timestamp that is in one of the time ranges in set of time ranges (step 204). The process can then analyze, by using natural language processing, the subset of log entries to identify a subset of the subset of log entries that has a high likelihood to be associated with one or problems in the system (step 206). Next, the process can extract human-readable text from the subset of the subset of log entries (step 208). The process can then search a knowledge database by using the human-readable text to identify one or more solutions to resolve the one or more problems in the system (step 210).

In step 202, the process can use a single technique or a combination of techniques to detect anomalous behavior. The time ranges during which anomalous behavior was detected can then be used in step 204. In general, any technique can be used to detect anomalies based on the telemetry data. For example, some embodiments can use the techniques described in U.S. Publication No. 2015/0339265 entitled "Detecting anomalies in a time series," which is herein incorporated by reference in its entirety to described techniques for detecting anomalies in a time series.

One technique uses self-similarity analysis of a time series of a system variable to identify a set of time ranges during which the telemetry data exhibits anomalous behavior. A time series is considered self-similar if the time series varies substantially the same on any scale. In other words, a time series is self-similar if it shows the same or similar statistical properties at different time scales or granularity. If a system variable is known to be self-similar, and if the current measurements of the system variable are not showing self-similar behavior, then the process can determine that the system variable is exhibiting anomalous behavior.

Another technique for detecting anomalous behavior can include establishing a normal operating range for a system variable based on historical data. Next, the process can detect anomalous behavior if the system variable continuously remains outside the normal operating range for a time period that is greater than a threshold time period.

In yet another technique, the process can construct a piecewise linear model of mutual dependence between two system variables. Next, the process can calculate a discrepancy between (1) the piecewise linear model, and (2) the measured values of the two system variables. If the discrepancy is greater than a threshold, then the process can determine that anomalous behavior is being exhibited.

Specifically, anomaly detection can be performed by comparing the historical trend of a metric combination for each device. Based on historical data, a piecewise linear model can be created, e.g., (1) a piecewise linear model that describes the relationship between the network traffic and processor utilization, and/or (2) a piecewise linear model that describes the relationship between the number of connections and memory usage. Now, whenever the telemetry data deviates sufficiently from the piecewise linear relationship, an anomaly can be detected. For example, if the telemetry data indicates a spike in processor utilization without a corresponding increase in the network traffic, then that may be detected as an anomaly. In some embodiments, the telemetry data is collected for 7-10 days. The data points of 10 sec granularity are stitched together to fit into straight line sections using the piecewise linear model and computed independently for each metric for 10 days in order to make meaningful comparisons. The dataset is discarded if (1) change in value is too small, (2) number of data points is too less, or (3) telemetry data is for less than 4 days. In some embodiments, the deviation threshold is set to a fixed percentage or number based on observing a huge dataset.

Prior to step 202, the process can receive the telemetry data and the set of log entries from a user via a support portal. Additionally, after step 210, the process can display the one or more solutions to the user via the support portal.

In step 206, the process can (1) calculate a sentiment score for each log entry in the set of log entries, and (2) identify the subset of the subset of log entries by ordering the log entries in increasing order of sentiment scores, whereby the log entries that are most likely to be associated with the one or more problems in the system will appear at the top of the ordering (in some embodiments, the process can also select log entries whose sentiment scores are lower than a threshold sentiment score). A number of techniques can be used to perform sentiment analysis. U.S. Publication No. 2015/0066814 entitled "Sentiment Analysis of Data Logs," and U.S. Publication No. 2015/0286627 entitled "Contextual sentiment text analysis," are herein incorporated by reference in their entirety for describing techniques for performing sentiment analysis.

In step 208, the process can identify the portions of a log entry that are not human-readable. This can be performed based on the structure or format of the log entries if known, or by using natural language processing to detect portions that are human-readable and those that are not. Non-human-readable portions can be stripped from the log entry to extract the human-readable portion.

Figure 3:
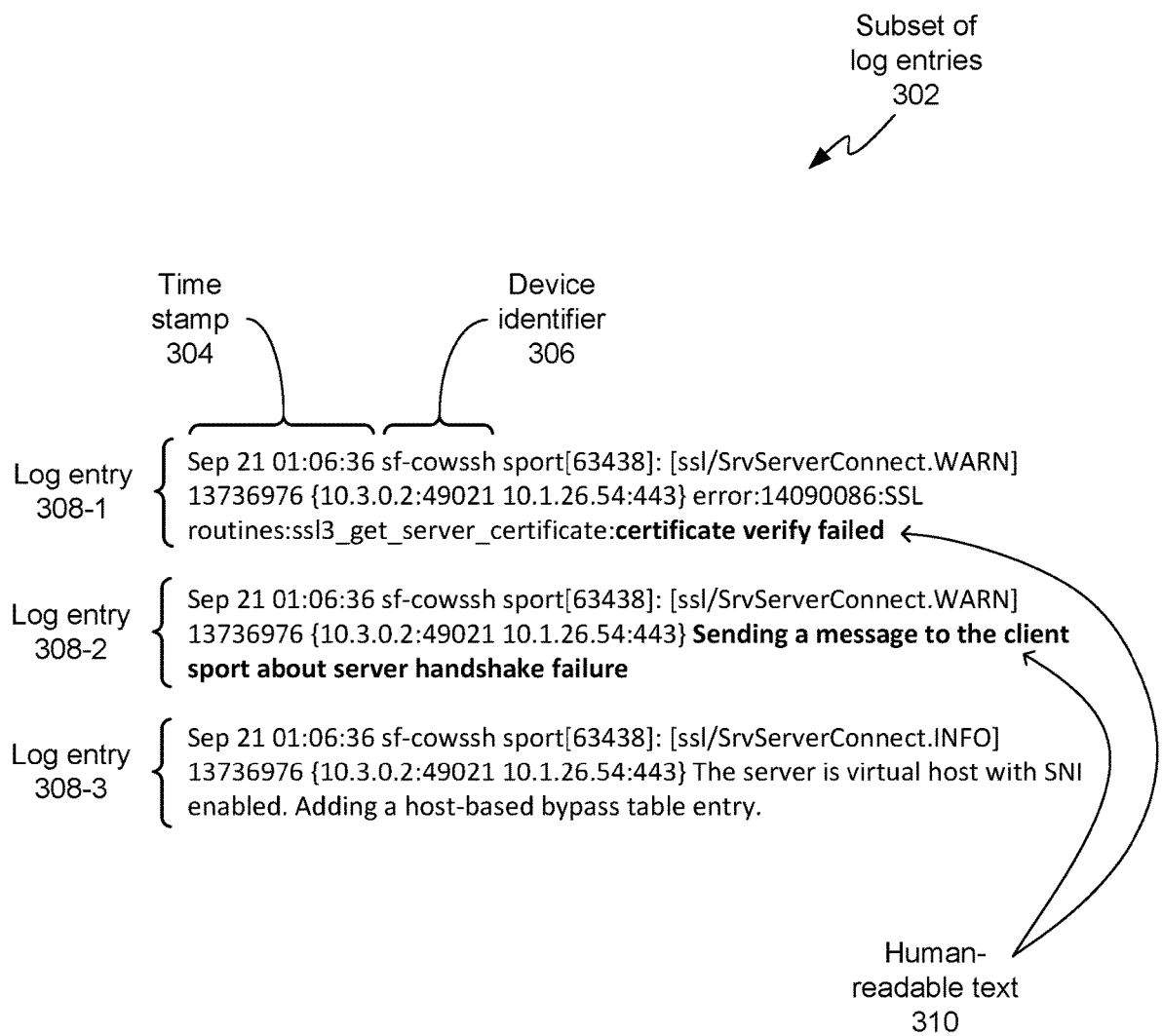
FIG. 3 illustrates a sample of log entries in accordance with some embodiments described herein.

FIG. 3 illustrates a sample of log entries in accordance with some embodiments described herein. A system may contain multiple devices, each having a log file. A single log file can be more than a 100 MB in size that includes hundreds of thousands of log entries from multiple processes. Telemetry data from a device (with device identifier 306) can indicate anomalous behavior during a set of time ranges (e.g., step 202) that includes time stamp 304. Subset of log entries 302 can be identified based on the identified time ranges (e.g., step 204). Subset of log entries 302 include log entries 308-1, 308-2, and 308-3. Next, natural language processing (and in particular sentiment analysis) can be used to identify a subset of the subset of log entries 302 that has a high likelihood of being associated with the problems that the system is experiencing. For example, log entries 308-1 and 308-2 are "warnings," whereas log entry 308-3 is "informational." Note that, apart from the log level (i.e., "WARN," "INFO," etc.) the text of the log entries also contains words such as "failed" or "failure" which can also be taken into account by using natural language processing to identify the log entries that are most likely related to the system problems. Therefore, in step 206, the process can identify log entries 308-1 and 308-2 as the subset of the subset of log entries 302 that has a high likelihood of being associated with the problems that the system is experiencing. Next, in step 208, human-readable text 310 (highlighted in bold in FIG. 3) can be extracted from log entries 308-1 and 308-2. In step 210, the human-readable text can be used to search a database of solutions. Note that, by extracting human-readable text, the process is able to focus on the part of the log entry that is not expected to change with each software upgrade. For example, log entry 302-1 includes the text "error:14090086:SSL routines: ssl3_get_server_certificate" which may be specific to a particular software version, and may not be useful for searching for solutions.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method for automated problem diagnosis, the method comprising:
    analyzing telemetry data of a system to identify a set of time ranges during which the telemetry data exhibits anomalous behavior;
    extracting, from a set of log entries generated by the system, a subset of log entries having a timestamp that is in one of the time ranges in set of time ranges;
    calculating, by using natural language processing, a sentiment score for each log entry in the subset of log entries;
    using the sentiment scores to identify a subset of the subset of log entries that has a high likelihood to be associated with one or more problems in the system, wherein said using the sentiment scores to identify the subset of the subset of log entries comprises ordering log entries based on increasing sentiment scores, whereby log entries that are most likely to be associated with the one or more problems in the system appear at the top of the ordering;
    extracting human-readable text from the subset of the subset of log entries; and
    searching a knowledge database by using the human-readable text to identify one or more solutions to resolve the one or more problems in the system.

2. The non-transitory computer-readable storage medium of claim 1, wherein said analyzing telemetry data of the system comprises using self-similarity analysis of a time series of a system variable.

3. The non-transitory computer-readable storage medium of claim 1, wherein said analyzing telemetry data of the system comprises detecting when a system variable value is outside a normal operating range.

4. The non-transitory computer-readable storage medium of claim 1, wherein said analyzing telemetry data of the system comprises detecting anomalous behavior based on calculating a discrepancy between (1) a piecewise linear model of mutual dependence between two system variables that is created based on historical data, and (2) measured values of the two system variables in the telemetry data.

5. The non-transitory computer-readable storage medium of claim 1, wherein prior to said analyzing the telemetry data of the system, the method comprises receiving the telemetry data and the set of log entries from a user via a support portal.

6. The non-transitory computer-readable storage medium of claim 5, wherein after said searching the knowledge database, the method comprises displaying the one or more solutions to the user via the support portal.

7. The non-transitory computer-readable storage medium of claim 1, wherein the telemetry data of the system comprises processor utilization, memory usage, disk load, and network traffic metrics, and wherein the set of log entries comprises notifications, warnings, errors, and alarms generated by processes executing on the system.

8. The method of claim 1, wherein said analyzing telemetry data of the system comprises detecting anomalous behavior based on calculating a discrepancy between (1) a piecewise linear model of mutual dependence between two system variables that is created based on historical data, and (2) measured values of the two system variables in the telemetry data.

9. The method of claim 1, wherein prior to said analyzing the telemetry data of the system, the method comprises receiving the telemetry data and the set of log entries from a user via a support portal.

10. The method of claim 1, wherein after said searching the knowledge database, the method comprises displaying the one or more solutions to the user via the support portal.

11. A computer, comprising:
    a processor; and
    a non-transitory computer-readable storage medium storing instructions that, when executed by the processor, cause the computer to perform a method for automated problem diagnosis, the method comprising:
        analyzing telemetry data of a system to identify a set of time ranges during which the telemetry data exhibits anomalous behavior;
        extracting, from a set of log entries generated by the system, a subset of log entries having a timestamp that is in one of the time ranges in set of time ranges;
        calculating, by using natural language processing, a sentiment score for each log entry in the subset of log entries;
        using the sentiment scores to identify a subset of the subset of log entries that has a high likelihood to be associated with one or more problems in the system, wherein said using the sentiment scores to identify the subset of the subset of log entries comprises ordering log entries based on increasing sentiment scores, whereby log entries that are most likely to be associated with the one or more problems in the system appear at the top of the ordering;
        extracting human-readable text from the subset of the subset of log entries; and searching a knowledge database by using the human-readable text to identify one or more solutions to resolve the one or more problems in the system.

12. The computer of claim 11, wherein said analyzing telemetry data of the system comprises using self-similarity analysis of a time series of a system variable.

13. The computer of claim 11, wherein said analyzing telemetry data of the system comprises detecting when a system variable value is outside a normal operating range.

14. The computer of claim 11, wherein said analyzing telemetry data of the system comprises detecting anomalous behavior based on calculating a discrepancy between (1) a piecewise linear model of mutual dependence between two system variables that is created based on historical data, and (2) measured values of the two system variables in the telemetry data.

15. The computer of claim 11, wherein prior to said analyzing the telemetry data of the system, the method comprises receiving the telemetry data and the set of log entries from a user via a support portal.

16. The computer of claim 15, wherein after said searching the knowledge database, the method comprises displaying the one or more solutions to the user via the support portal.

17. The computer of claim 11, wherein the telemetry data of the system comprises processor utilization, memory usage, disk load, and network traffic metrics, and wherein the set of log entries comprises notifications, warnings, errors, and alarms generated by processes executing on the system.

18. A method for automated problem diagnosis, the method comprising:

analyzing, by using a computer, telemetry data of a system to identify a set of time ranges during which the telemetry data exhibits anomalous behavior, wherein the telemetry data of the system comprises processor utilization, memory usage, disk load, and network traffic metrics;

extracting, from a set of log entries generated by the system, a subset of log entries having a timestamp that is in one of the time ranges in set of time ranges, wherein the set of log entries comprises notifications, warnings, errors, and alarms generated by processes executing on the system;

calculating, by using natural language processing, a sentiment score for each log entry in the subset of log entries;

using the sentiment scores to identify a subset of the subset of log entries that has a high likelihood to be associated with one or more problems in the system, wherein said using the sentiment scores to identify the subset of the subset of log entries comprises ordering log entries based on increasing sentiment scores, whereby log entries that are most likely to be associated with the one or more problems in the system appear at the top of the ordering;

extracting human-readable text from the subset of the subset of log entries; and searching a knowledge database by using the human-readable text to identify one or more solutions to resolve the one or more problems in the system.

* * * * *